United States Patent [19]

Dow et al.

[11] Patent Number: 4,777,548
[45] Date of Patent: Oct. 11, 1988

[54] ACCESS DOOR FOR TAPE DRIVE HOUSING

[75] Inventors: James Dow; John W. Dong, both of Ft. Collins; David Lundgren, Greeley, all of Colo.

[73] Assignee: Hewlett-Packard Company, Palo Alto, Calif.

[21] Appl. No.: 939,378

[22] Filed: Dec. 8, 1986

[51] Int. Cl.⁴ .............................................. G11B 15/00
[52] U.S. Cl. ..................................... 360/96.5; 360/90; 360/137
[58] Field of Search ......................... 360/83, 90, 85, 93, 360/95, 81, 88, 96.6, 96.5, 130.21, 137; 242/197, 199, 182

[56] References Cited

U.S. PATENT DOCUMENTS 4,185,200 1/1980 Müller et al. ...................... 250/471
4,314,294 2/1982 Riccio et al. ...................... 360/96.6

FOREIGN PATENT DOCUMENTS 369904 2/1983 Austria .
0142088 5/1985 European Pat. Off. .
0180273 5/1986 European Pat. Off. .
2145478 3/1972 Fed. Rep. of Germany .
0138706 12/1978 Japan ...................... 360/95
0205946 12/1983 Japan ...................... 242/182
0136942 7/1985 Japan ...................... 242/182

Primary Examiner—Robert S. Tupper
Assistant Examiner—Andrew L. Sniezek
Attorney, Agent, or Firm—Guy J. Kelley; Jeffery B. Fromm

[57] ABSTRACT

An access door is described for a housing for tape drive apparatus of the type including a take-up reel, a hub for a supply reel, and a fan for moving air within the housing. The access door is hinged to the housing and is pivotable between open and closed positions. The access door includes an interior face which forms a ramp for guiding the supply reel into the housing and onto the hub. The door also includes an inlet port for receiving air from the fan, at least one exit port, and a passageway for communicating air between the inlet port and the exit port. Air leaving the exit port in the door is directed around the periphery of the supply reel.

16 Claims, 5 Drawing Sheets

ACCESS DOOR FOR TAPE DRIVE HOUSING

FIELD OF THE INVENTION

This invention relates to tape drive apparatus. More particularly, this invention relates to housings for magnetic tape drives. Even more particularly, this invention relates to access doors for use in housings for tape drives.

BACKGROUND OF THE INVENTION

Tape drives used in data processing applications utilize large reels of magnetic tape (e.g., ½ inch width tape). The tape supply reel must be loaded into the tape drive apparatus at the front when several tape drives are stacked on top of each other or when the tape drive is otherwise positioned where there is no top access to the drive.

However, when loading the tape supply reel into the tape drive from the front, it is difficult to see the hub on which the supply reel is to be positioned. For example, the top of the hub may be higher than the bottom of the access opening. Also, when the tape drives are stacked upon each other, and the access door is on the front edge of the tape drive housing, it is not possible to normally thread the tape from the supply reel to the take-up reel or hub.

SUMMARY OF THE PRESENT INVENTION

In accordance with the present invention there is provided a unique access door for a tape drive housing. The tape drive apparatus includes a take-up reel, a hub for a supply reel, and a fan for moving air within the housing.

The hinged access door is mounted on one face of the housing (typically on the front face) and is pivotable between open and closed positions. The access door includes an interior face having inlet port means and exit port means. The door includes an air passageway communicating between the inlet and exit port means.

When the door is in the open position the interior face of the door forms a ramp for guiding the supply reel into the housing and onto the hub. When the door is in the closed position the inlet port in the door is adapted to receive air from the fan. The passageway is adapted to direct air from the inlet port means to the exit port means in the door. The exit port means is adapted to direct the forced air around the supply reel in a manner such that the loose end of the tape is urged off the supply reel and is urged to the take-up reel or hub where it is taken up.

Preferably the interior surface of the access door is planar or includes a large generally planar area so that the supply reel will slide over it smoothly when it is being loaded into the tape drive housing and when it is being taken out again.

Preferably the interior surface of the door includes a curved access which is adapted to receive the outer edge of the supply reel when the door is in the closed position.

Other advantages of the access door of the invention will be apparent from the following description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
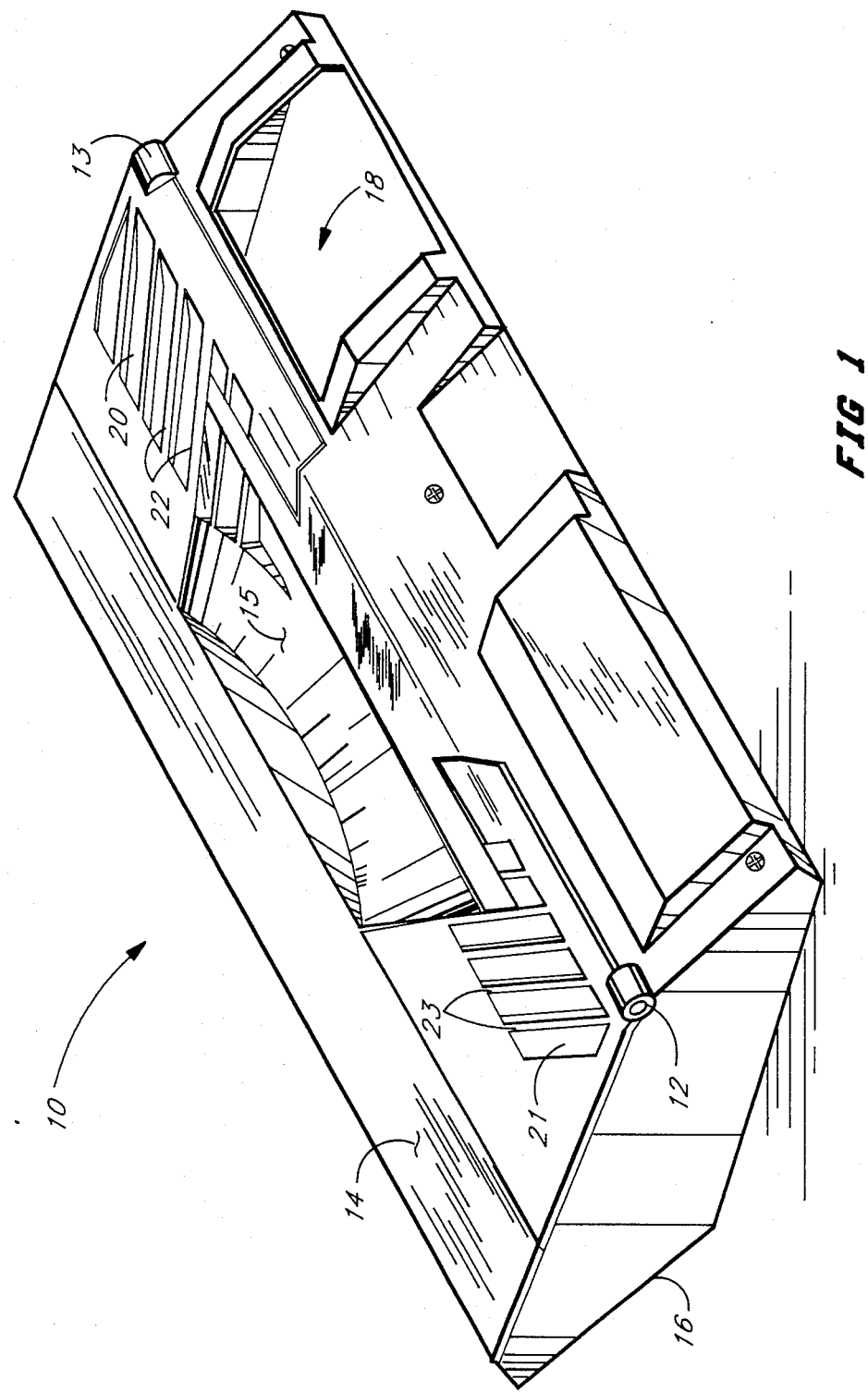
FIG. 1 is a perspective view of one embodiment of an access door of this invention.
Figure 2:
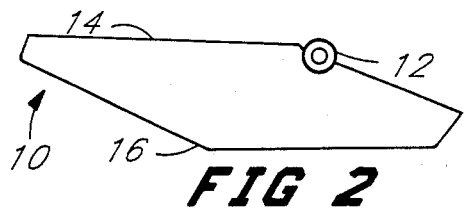
FIG. 2 is an end view of the access door of FIG. 1.

In FIGS. 1 and 2 there is illustrated one embodiment of access door 10 of the invention which is adapted to be hingably or pivotably mounted between its opposite ends by means of mounting hinges 12 and 13. The access door 10 includes an interior face 14 and exterior surface 16.

As used herein, the reference to an interior face means the face which is interior of the tape drive housing when the access door is closed. Reference to an exterior surface is intended to mean the surface of the access door which is on the exterior of the housing when the door is in closed position.

The access door 10 includes an inlet port means 18 on its interior face, and it also includes at least one exit port means on its interior face. In FIG. 1 there are shown exit port means 20 and 21. Thus, an air stream is adapted to be received in the access door through the inlet port 18, and the air may exit through both ports 20 and 21. In the embodiment illustrated in FIG. 1 the door has a cavity therein. Thus, air entering through inlet port 18 can only exit through exit ports 20 and 21. Alternatively, there may be an air passageway communicating directly from the inlet port to the exit ports.

Vanes or louvers 22 in exit port 20, and vanes or louvers 23 in exit port 21, are adapted to direct the flow of air through the exit ports in a manner such that air is directed around the edges of a tape supply reel placed in the tape drive apparatus. This feature is illustrated in subsequent figures.

Preferably the interior face 14 of the access door also includes a curved recess 15 therein which is adapted to receive the outer edge of a tape supply reel when the supply reel is loaded into the tape drive apparatus and the access door is closed. This feature is illustrated in FIG. 4.

Figure 3:
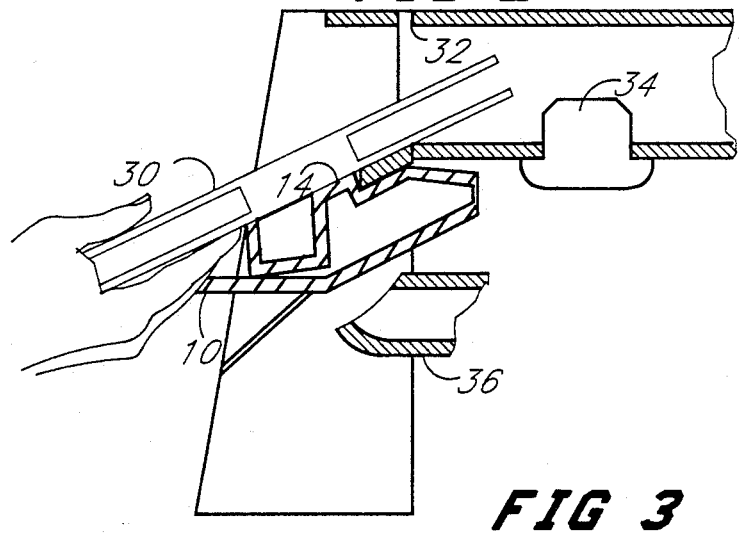
FIG. 3 is a side elevational view illustrating the access door in open position on a housing for tape drive apparatus.

Preferably the interior surface of the access door is planar or includes a generally planar surface. This is illustrated, for example, in the end view of FIG. 2. In FIG. 3 the access door is in open position and the planar surface is shown being used as a ramp for loading a tape supply reel 30 into the tape drive housing 32 and onto the hub 34.

Because the hub 34 is elevated, it is necessary to load the tape supply reel without angling it upwardly while inserting it into the housing. Thus, when the access door has a planar surface which forms a ramp for the reel, the loading of the reel into the housing is greatly facilitated.

Figure 4:
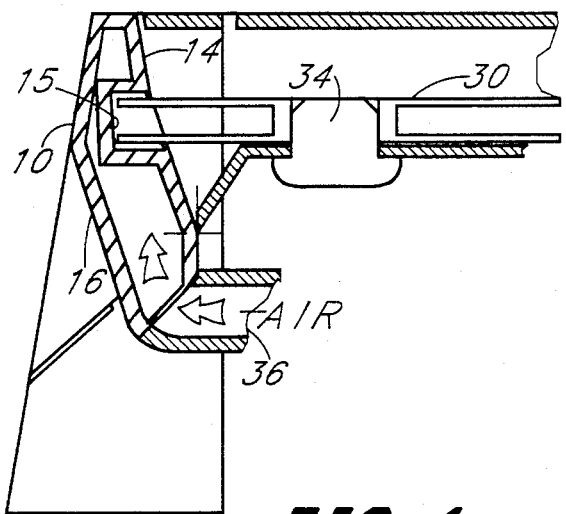
FIG. 4 is a side elevational view illustrating the access door of FIG. 3 in closed position.

When the tape supply reel has been loaded into the tape drive apparatus, he access door 10 is closed as shown in FIG. 4. The outer edge of the tape reel is received within the recess 15 in the door. Air from a fan within the tape drive housing enters the access door at the bottom via air duct 36 and flows through the door to the exit ports which are preferably located adjacent each end of the recess 15. The air can then flow around the tape supply reel to facilitate self-threading of the tape through the housing to the take-up hub or reel, as illustrated and explained hereafter in connection with FIG. 6.

Figure 5:
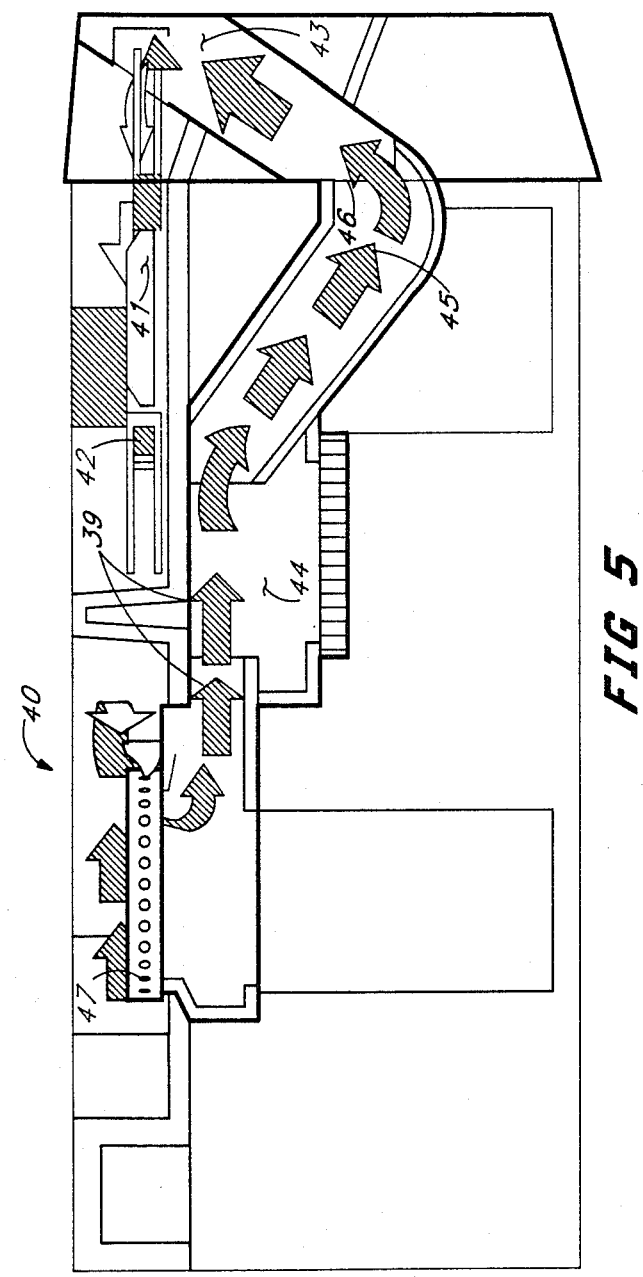
FIG. 5 is a side elevational view showing the access door in closed position in a tape drive housing and illustrating the flow of air through the door.

In FIG. 5 there is shown an elevational view of tape drive apparatus 40 utilizing the access door 43 of the invention. Tape supply reel 42 is positioned on hub 41. Access door 43 is shown in closed position. Fan 44 directs air through conduit 45 to the inlet port 46 in access door 43. The air then proceeds upwardly through the door and exits around the tape supply reel in a manner such that the free end of the tape is directed along a path to the take-up reel or hub 47. The air may then re-circulate as illustrated by the arrows 39.

Figure 6:
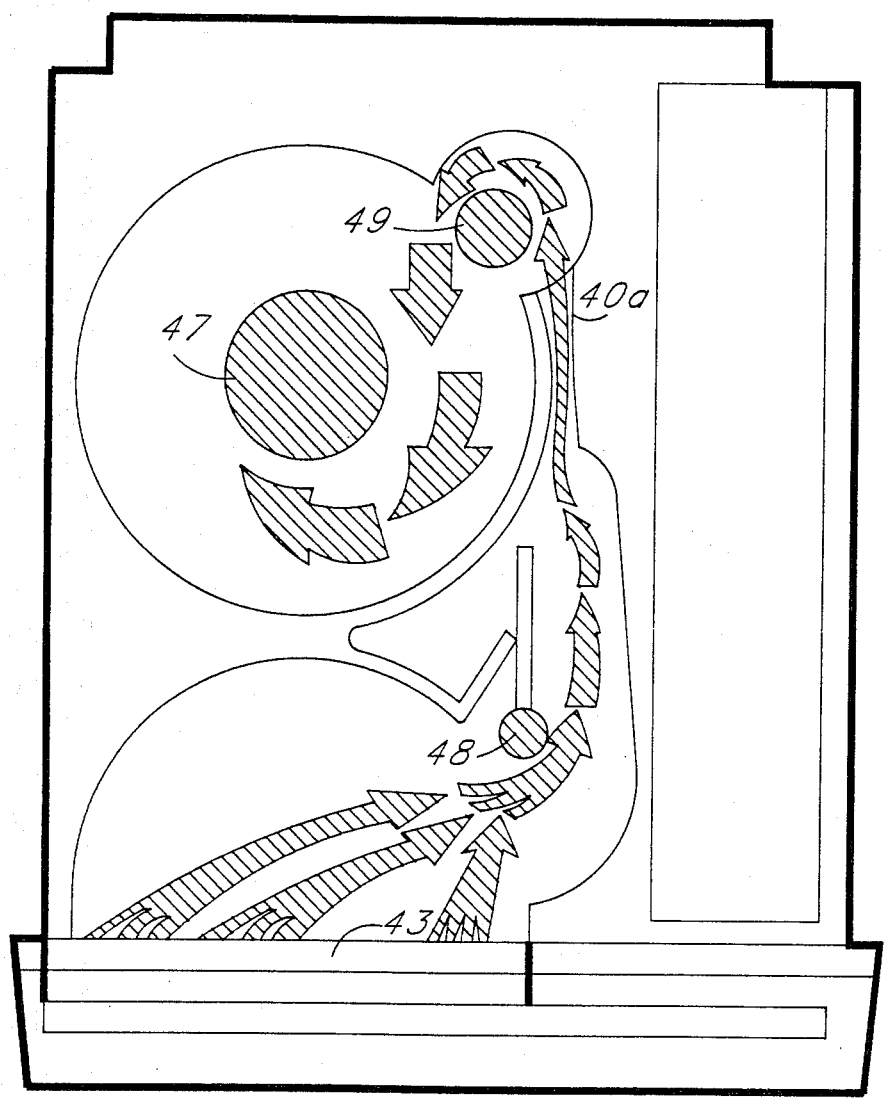
FIG. 6 is a top view of the tape drive apparatus shown in FIG. 5.

FIG. 6 is a top view of the apparatus shown in FIG. 5, without the tape supply reel present. The arrows illustrate the path of the air flow from the access door 43 to the take-up reel or hub 47. With this arrangement the end of the tape from the supply reel is urged by the air stream over the tension sensor roller 48, past the tape head 40a around the speed sensor roller 49, and onto take-up hub 47.

Figure 7:
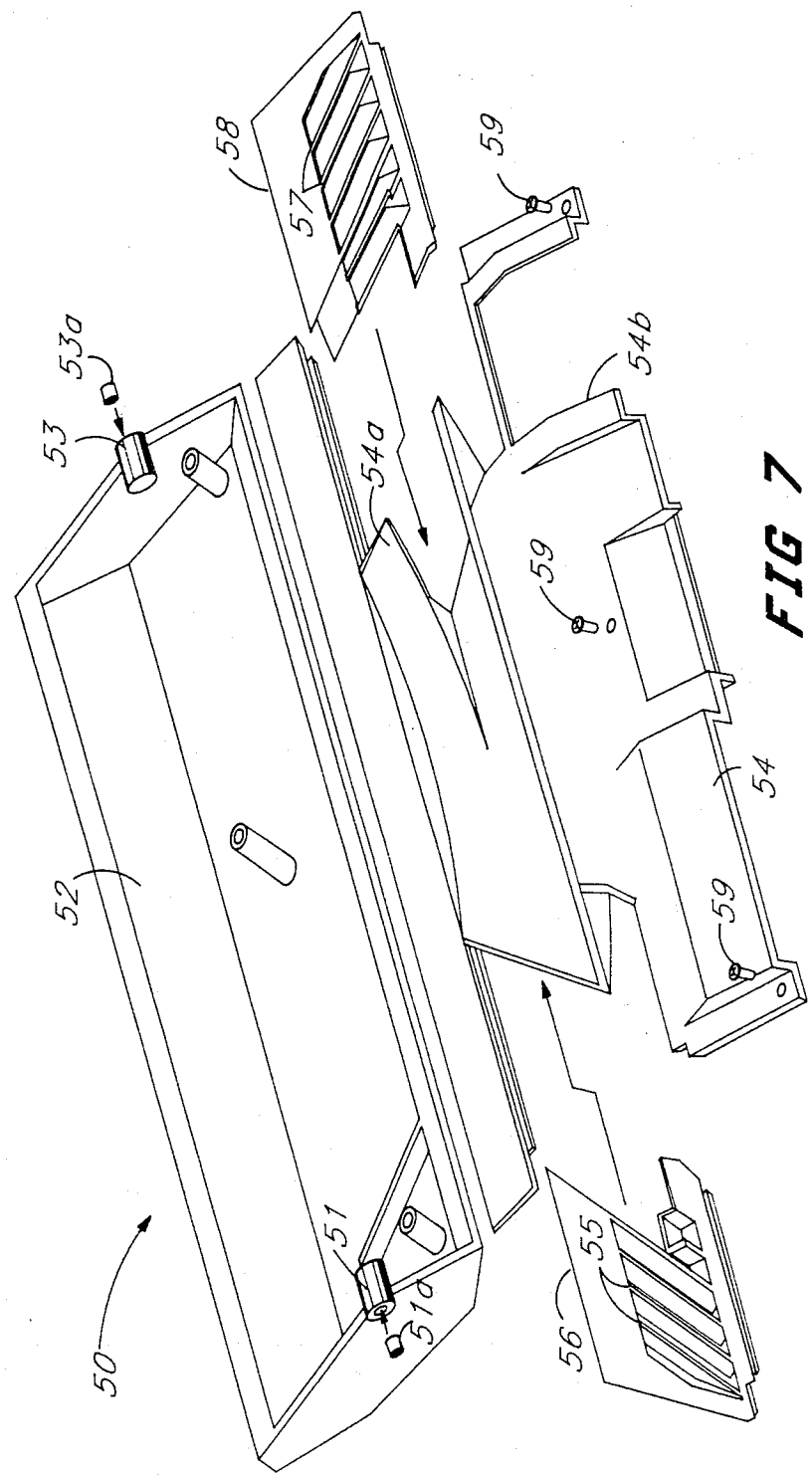
FIG. 7 is an explosion view of a preferred embodiment of access door of the invention.

In FIG. 7 there is shown an explosion view of a preferred embodiment of access door 50. This preferred embodiment of access door comprises four main sections. Main body section 52 may be made of molded plastic and includes hinge pivot mountings 51 and 53. Metal bushing inserts 51a and 531 are adapted to fit in mountings 51 and 53. Back plate 54 may also be made of molded plastic and it preferably includes curved recess 54a which is adapted to receive the periphery of the tape supply reel when the door is mounted on a tape drive housing and closed.

Plates 56 and 58 are adapted to be slidably received in back plate 54. Plate 56 includes vanes 55, and plate 58 includes vanes 57. The vanes in each plate are in the openings defining the exit ports.

Opening 54b in plate 54 serves as the air inlet opening for the access door when the sections are in assembled form. Plate 54 is secured to main section 52 by means of screws 59.

Preferably all of the sections of the access door are made of molded plastic. However, if desired, the sections may be made of metal.

What is claimed is:

1. In a housing for tape drive apparatus of the type including a take-up reel, a hub for a supply reel, and a fan means for moving air within said housing for air to flow around said supply reel to facilitate self-threading of a tape through said housing to said take-up reel, wherein the improvement comprises a hinged access door on one face of said housing, said access door being pivotable between open and closed positions; wherein said access door includes an interior surface having inlet port means and exit port means, and said door including an air passageway communicating between said inlet and exit port means; wherein when said door is in said open position said interior surface forms a ramp for guiding said supply reel into said housing and onto said hub, and wherein when said door is in said closed position said inlet port means in said door is adapted to receive air from said fan means, and said passageway is adapted to direct air from said inlet port means to said exit port means, and wherein said exit port means is adapted to direct air around said supply reel.

2. The improvement of claim 1, wherein said interior surface of said access door is generally planar.

3. The improvement of claim 1, wherein said exit port means comprises first and second openings in said interior surface, said first opening being located near one end of said door and said second opening being located near the opposite end of said door.

4. The improvement of claim 3, wherein said first and second openings are louvered.

5. The improvement of claim 1, wherein said inlet port means comprises an opening in said interior surface near one end of said door.

6. The improvement of claim 1, wherein said interior surface of said door includes a curved recess which is adapted to receive the outer edge of said supply reel when said door is in said closed position.

7. The improvement of claim 6, wherein said exit port means comprises first and second openings in said interior surface, said first opening being located adjacent one end of said recess, and said second opening being located adjacent the opposite end of said recess.

8. The improvement of claim 1, wherein said interior surface of said door includes first and second plate members, wherein said plate members are detachably secured to said door, and wherein said plate members include at least one opening.

9. The improvement of claim 8, wherein said opening in said plate members is louvered.

10. In a housing for tape drive apparatus of the type including a take-up reel, a hub for a supply reel, and a fan means for moving air within said housing for air to flow around said supply reel to facilitate self-threading of a tape through said housing to said take-up reel, wherein the improvement comprises a hinged access door on one face of said housing, said access door being pivotable between open and closed positions; wherein said access door includes an interior surface having inlet port means and exit port means, and said door including an air passageway communicating between said inlet and exit port means; wherein said inlet port comprises an opening in said interior surface of said door; wherein said interior surface of said door includes a curved recess which is adapted to receive the outer edge of said supply reel when said door is in said closed position; wherein when said door is in said open position said interior surface forms a ramp for guiding said supply reel into said housing, and wherein when said door is in said closed position said inlet port means in said door is adapted to receive air from said fan means, and said passageway is adapted to direct air from said inlet port means to said exit port means, and wherein said exit port means is adapted to direct air around said supply reel.

11. The improvement of claim 10, wherein said interior surface of said access door is generally planar.

12. The improvement of claim 10, wherein said exit port means comprises first and second openings in said interior surface, said first opening being located near one end of said door and said second opening being located near the opposite end of said door.

13. The improvement of claim 12, wherein said first and second openings are louvered.

14. The improvement of claim 10, wherein said interior surface of said door includes two plate members, one of said plate members being located near one end of said door and the other of said plate members being located near the opposite end of said door; wherein said plate members include a louvered opening.

15. The improvement of claim 14, wherein each said louvered opening is adapted to direct air along the periphery of said supply reel.

16. The improvement of claim 12, wherein said first and second openings are disposed adjacent opposite ends of said curved recess.

* * * * *